United States Patent [19]

Douaud et al.

[11] 4,213,429

[45] Jul. 22, 1980

[54] METHOD AND DEVICE FOR AUTOMATICALLY ADJUSTING THE SPARK ADVANCE OF A CONTROLLED IGNITION ENGINE

[75] Inventors: Andre Douaud, Puteaux; Joseph Rialan, Meudon, both of France

[73] Assignee: Institut Francais du Petrole, Rueil-Malmaison, France

[21] Appl. No.: 945,711

[22] Filed: Sep. 25, 1978

[30] Foreign Application Priority Data

Sep. 26, 1977 [FR] France .................................. 7729105

[51] Int. Cl.² ............................................. F02P 5/04
[52] U.S. Cl. ................................... 123/414; 123/416; 123/422 G; 123/425
[58] Field of Search ........... 123/117 R, 117 D, 148 E, 123/32 EA, 32 EB, 32 EC, 119 ED

[56] References Cited

U.S. PATENT DOCUMENTS

| | | | |
|---|---|---|---|
| 4,002,155 | 1/1977 | Harned et al. | 123/148 E |
| 4,054,111 | 10/1977 | Sand | 123/117 R |
| 4,061,116 | 12/1977 | Saida et al. | 123/117 D |
| 4,120,272 | 10/1978 | Douaud et al. | 123/148 E |
| 4,131,097 | 12/1978 | Sawada et al. | 123/117 R |
| 4,133,475 | 1/1979 | Harned et al. | 123/117 D |

*Primary Examiner*—P. S. Lall
*Attorney, Agent, or Firm*—Millen & White

[57] ABSTRACT

An accelerometer located on the cylinder head of the engine supplies a signal which is twice integrated thus giving a resulting signal whose peak value is detected. The spark advance is automatically adjusted so that this peak value occurs in a preselected angular position of the crankshaft.

6 Claims, 4 Drawing Figures

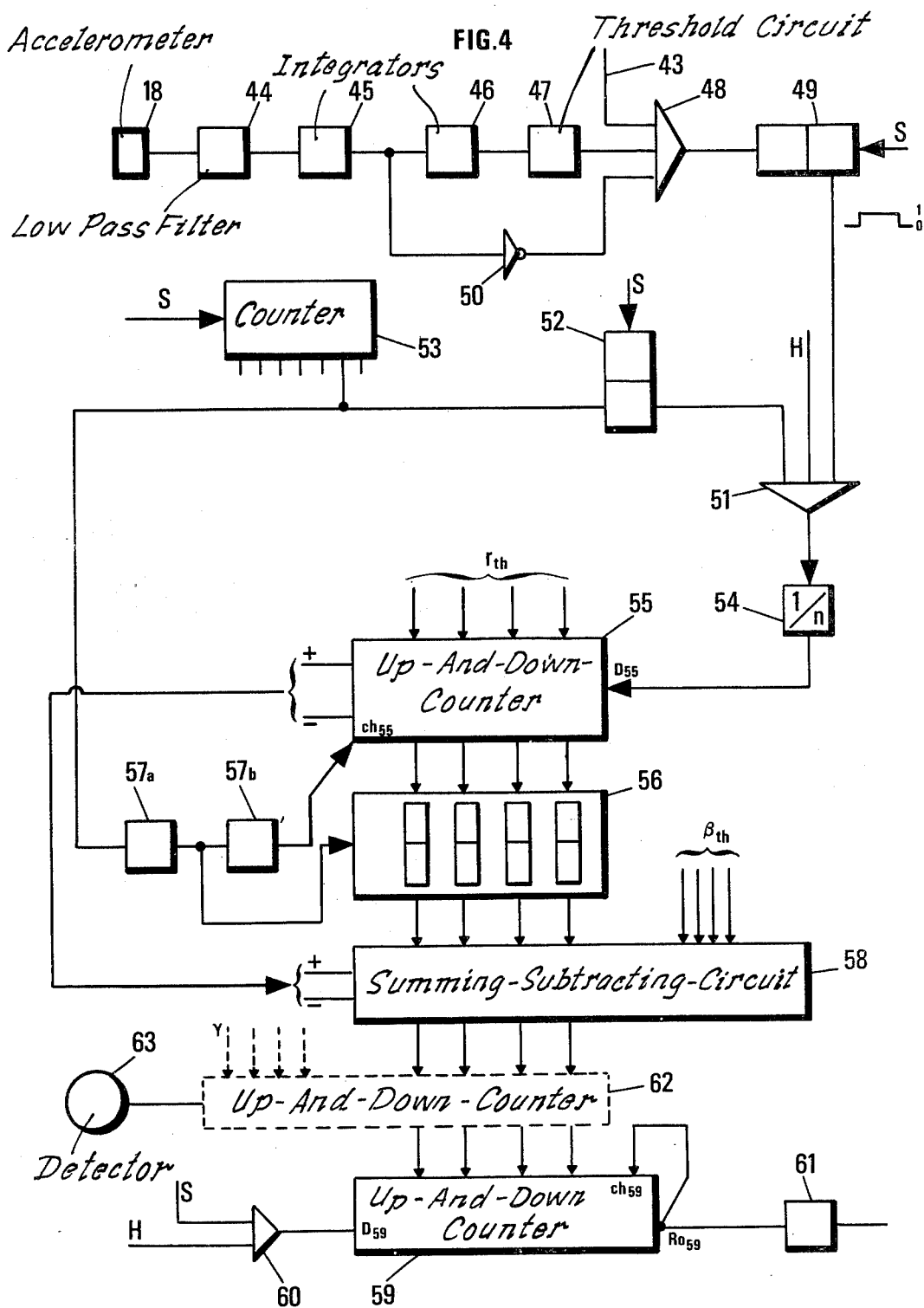

METHOD AND DEVICE FOR AUTOMATICALLY ADJUSTING THE SPARK ADVANCE OF A CONTROLLED IGNITION ENGINE

BACKGROUND OF THE INVENTION

The present invention relates to a method and a device for automatically adjusting the ignition timing or a controlled ignition engine as a function of preselected operating conditions of this engine. Such conditions may for example, but not exclusively, be an optimum adjustment of the spark advance for maximum output and efficiency of the engine.

The operating conditions of the engine being known, for example by measuring the values of characteristic parameters (running speed of the engine, intake manifold vacuum, temperature and fuel-air ratio of the mixture which feeds the cylinders, proportion of burnt gases recycled to the engine intake, etc. . . . ) it is well known that under substantially normal operating conditions of the engine there is a relationship between the sparking time in a cylinder and the time at which the pressure rise in this cylinder reaches its maximum or peak value, these times being generally identified by the corresponding angular positions of the crankshaft.

Thus, for example, when the ignition timing corresponds to the optimum spark advance, it has been ascertained that the pressure peak in the considered cylinder occurs at a determined angular position of the crankshaft, about 15° 30' after the top dead center. The optimum spark advance can thus be obtained by adjusting the ignition timing until the observed pressure peak coincides with the above angular position of the crankshaft, i.e. substantially 15° 30' after the top dead cennter.

One problem to be solved is to determine with accuracy the instantaneous value of the pressure in the engine cylinders, to locate the angular position of the crankshaft corresponding to the maximum value of this pressure and to correspondingly adjust the ignition timing.

In French Patent No. 2,109,698 it has been proposed on page 3, lines 14-16 and 34-36 "to so control the spark advance that the explosion always occurs in the optimum angular position of the crankshaft. This is achieved by using a sensor whose response curve is more or less linear, this sensor delivering a signal having a steep leading edge". A drawback of the process results from the fact that, in practice, there is no instantaneous explosion, so that the control of the spark advance is not accurate and this is particularly true as the engine running speed is increased.

In French patent application No. 2,270,450 reference is made on page 3, lines 24-31 "to prior studies on combustion in an internal combustion engine showing that this combustion comprises two different steps. The first step, which immediately follows sparking in a low pressure combustion step wherein the gas mixture is ignited and a flame begins to spread into the combustion chamber. Then a strong pressure discontinuity is observed corresponding to the beginning of the second combustion step." This beginning of the second step can be detected by using for example a piezo-electric transducer which delivers a signal as soon as the pressure rises above a preselected threshold value and the spark advance is so adjusted that the beginning of the second combustion step occurs at a preselected angular position of the crankshaft. Such a process suffers from the drawback of requiring a substantial modification of the engines to permit location of the piezo-electric sensor and it appears difficult in practice to detect with a sufficient accuracy the beginning of the combustion step.

It has already been proposed, during the S A E Meeting No. 750,883 (held in Detroit-Michigan, U.S.A., Oct. 13–17, 1975) to use ring-shaped piezo-electric sensors placed between the spark plugs and the cylinder head. Such sensors may work satisfactorily, but they make replacement of the spark plugs with new ones more difficult because this operation must be effected without damaging the sensors. Additionally, it is necessary to obtain proper sealing when positioning the new plugs. Moreover, the electric pulses generated by the ignition may in some instances interfere with the sensors' operation and make repair and maintenance operations in the plug vicinity more difficult.

The present invention provides a method and a device for obviating these drawbacks.

BRIEF DESCRIPTION OF THE DRAWINGS

The invention will be easily understood and all its advantages made apparent from the following description of an embodiment thereof illustrated by the accompanying drawings, wherein:

FIGS. 3 and 4 show in more detail the construction of the electronic circuit diagrammatically shown in FIG. 2.

FIG. 1 illustrates, by way of example, a four cylinder engine 1 equipped with an electronic ignition circuit, designated as a whole by reference numeral 2. Broadly speaking, this circuit comprises a voltage source 3, feeding a main circuit which includes a condenser 5 connected to the primary winding 9 of the ignition coil, and a capacitor discharge circuit comprising a thyristor 4 connected in derivation to the main circuit. The secondary winding 10 of the ignition coil supplies electric current successively to the spark plugs 13, 14, 15 and 16 of the engine 1, through the distributor 11 whose rotor 12 is driven by the crankshaft 17 of the engine through driving means (not shown).

Figure 1:
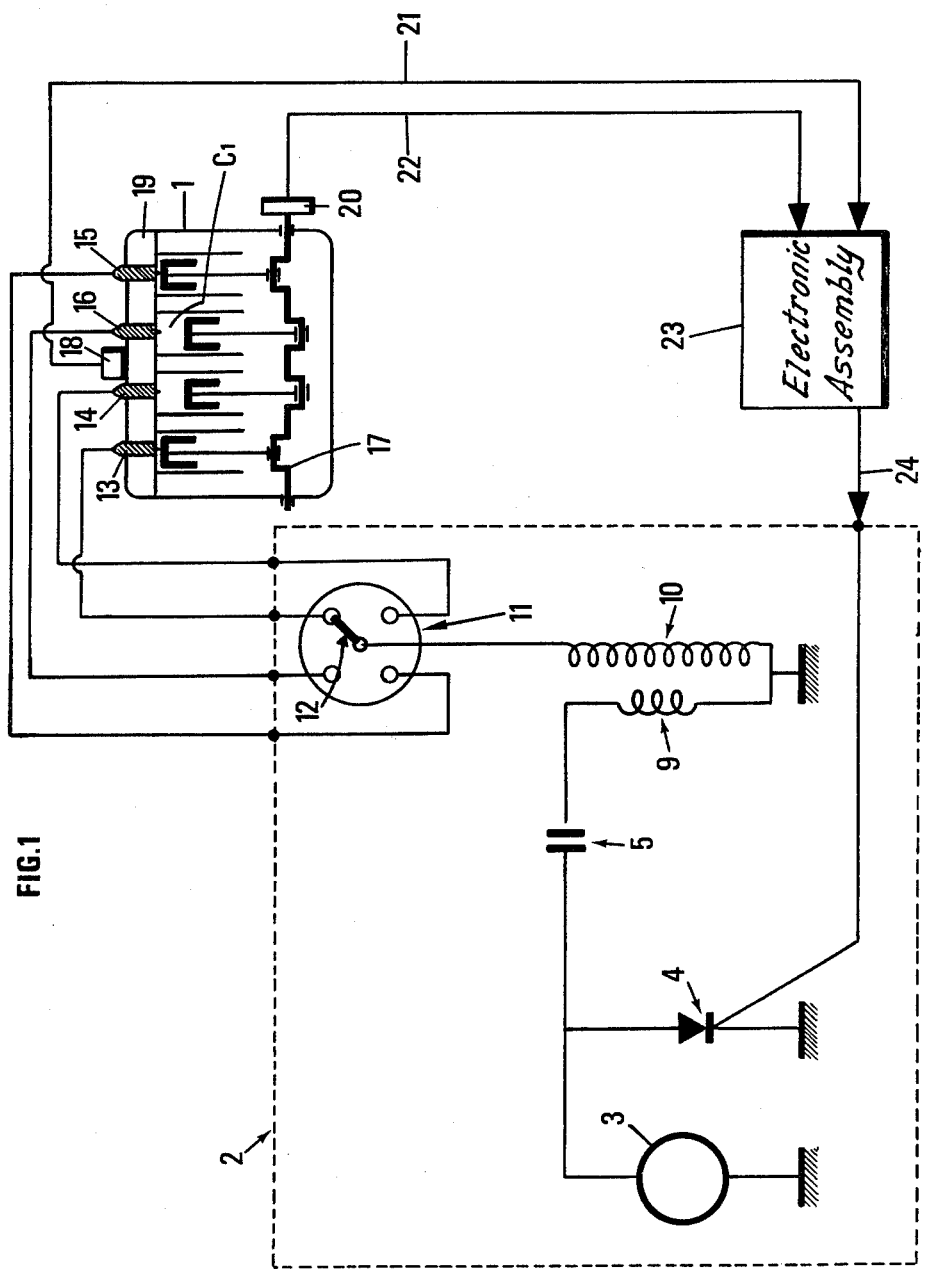
FIG. 1 diagrammatically shows an engine equipped with a device according to the invention, FIG. 2 diagrammatically illustrates the electronic means controlling the ignition circuit.

The engine is equipped with an accelerometer 18, secured to the cylinder head 19 of the engine 1 and with means 20 for detecting at least one preselected reference angular position of the crankshaft. The accelerometer 18 and the detecting means 20 deliver information in the form of signals transmitted respectively by conductors 21 and 22 to an electronic assembly 23 adapted to automatically deliver a control signal to the ignition circuit, this signal being transmitted by conductor 24 to the control electrode or trigger circuit of thyristor 4.

Figure 2:
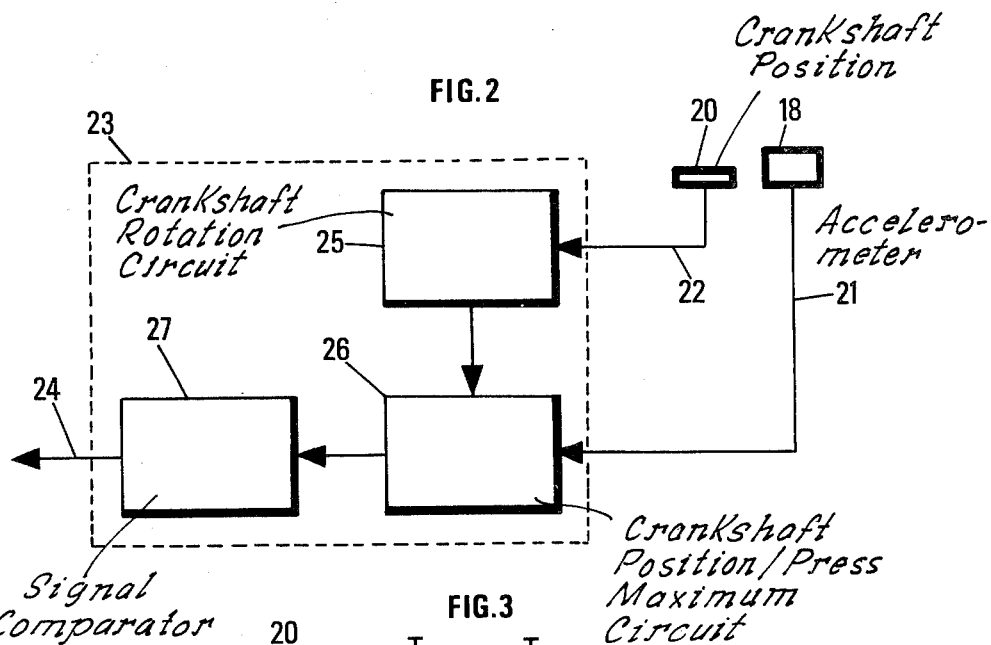

FIG. 2 diagrammatically shows the arrangement of the main electronic circuits of the assembly 23.

As shown in this drawing, the signal generated by the detecting means 20 is transmitted to a circuit 25 generating a signal representing the angular rotation of the crankshaft. The signal from the accelerometer 18 and the signal delivered by circuit 25 are received by circuit 26 which delivers a signal representing the angular position of the crankshaft when the pressure reaches its maximum value in at least one of the engine cylinders. This last signal is compared with a preset or reference signal in a circuit 27 which automatically elaborates the signal for controlling the ignition circuit.

The accelerometer 18 which may be of a known type will not be described here in detail. It will generally comprise a piezoelectric ceramic and a seismic mass pressed against the ceramic through resilient means.

The means, such as detector 20, adapted to detect the passage of the crankshaft at a preselected reference position may also be of any known type. They may in particular comprise an optical sensor, such as a photocell, and a wheel provided with at least one optical mark which actuates the optical sensor when registering therewith during the rotation of the wheel. This wheel may be keyed onto the crankshaft or preferably onto a shaft driven in rotation by the crankshaft at half the rotation speed thereof. Mechanical means may also be used, such as means comprising a cam fast in rotation with the crankshaft and which periodically opens or shuts electrical contacts.

Figure 3:
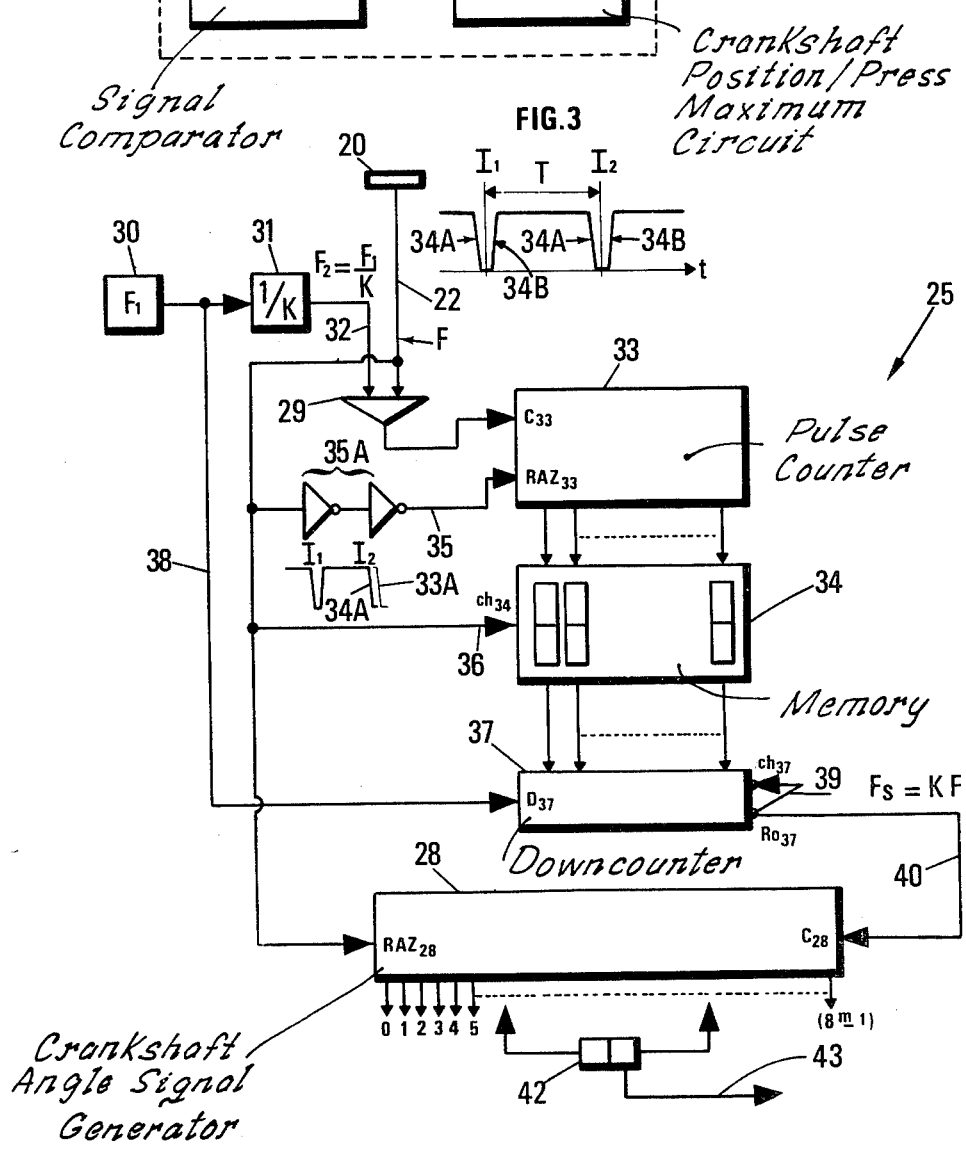

FIG. 3 illustrates an embodiment of the electronic circuit 25 which receives from transducer 20 a signal formed of pulses $I_1$, $I_2$ separated by a time interval which represents a rotation angle $\alpha_R$ of the crankshaft. The value of this angle, which is preferably a submultiple of 360° and generally at most equal to 360°, will depend on the construction characteristics of transducer 20. The time interval T between these pulses is in reverse proportion to the rotation speed of crankshaft 17 and in direct proportion to $\alpha_R$.

$$T = 6 \frac{\alpha_R}{N}$$

wherein T is the time interval in seconds between two successive pulses,

N is the average rotation speed (in r.p.m.) of the crankshaft during the time interval T and $\alpha_R$ is expressed in degrees.

The apparent frequency of the pulses is $$F = \frac{1}{T}$$

The signal emanating from transducer 20 is applied to a first input of an AND-gate circuit 29.

An oscillator 30, which may be of the resistor-capacitor type of frequency $F_1$, is connected to a dividing-by-K circuit 31 (K being an integer greater than 1) which is connected through conductor 32 to a second input terminal of circuit 29 to which it delivers pulses at the frequency $$F_2 = \frac{F_1}{K}$$

having thus the period $T_2 = KT_1$. The output terminal of circuit 29 is connected to the up-counting input terminal $C_{33}$ of an electric pulse counter 33. This counter 33 may be of a conventional type known in the art as "Type 7493" and sold by various manufacturers.

Upon receiving pulse $I_1$, and more precisely at the arrival of the leading edge 34 B of this pulse, circuit 29 delivers, on its output terminal, the pulses produced by the circuit 31, which are summed up in counter 33 up to the arrival of the trailing edge 34 A of the following pulse $I_2$, i.e. during the time interval T separating pulse $I_1$ from pulse $I_2$.

The flip-flop circuits of counter 33 are connected in parallel, through conductors, to an equal number of separate elements or flip-flop circuits of a memory circuit 34. This memory 34 may be of a type known in the art as "type 7474".

Counter 33 has an input terminal $RAZ_{33}$ for resetting to zero which is connected to transducer 20 through a conductor 35 comprising conventional means 35 A for delaying the transmission of the leading edge 34 A of the pulses $I_1$, $I_2$ ... to the terminal $RAZ_{33}$ of counter 33.

The memory 34 has a loading input $Ch_{34}$ which is connected to transducer 20 through a conductor 36.

Thus when pulse $I_2$ is generated after a rotation $\alpha_R$ of the crankshaft, the leading edge 34 A of pulse $I_2$ causes the transfer of the digital content $F_2 \times T$ or count of counter 33 into the memory 34, and the leading edge 33 A, reaching counter 33 with a certain time lag relative to the leading edge 34 A (this delay being smaller thant the pulse duration and caused by circuits 35 A), resets counter 33 to zero. This counter is then ready for registering further pulses emanating from AND gate 29 during a further revolution $\alpha_R$ of the crankshaft 17.

The pulse storage or memory circuit 34 has its output terminals respectively connected to the set terminals of a downcounting circuit 37 ("type 74193" for example).

This circuit 37 has a downcounting input terminal $D_{37}$ connected through conductor 38 to the output terminal of oscillator 30 whose frequency is $F_1$. Circuit 37 has also a terminal $R_{0-37}$ on which a signal appears at each zero value of the count of this downcounting element 37.

The time interval $T_s$ necessary for resetting to zero element 37 whose initial digital content delivered by the storage circuit 34 is $F_2T$ and which receives downcounting pulses at frequency $F_1$, is defined by the relationship:

$$T_s.F_1 = F_2.T$$

Thus the frequency of the zero resets of element 37 is:

$$F_s = \frac{F_1}{F_2 \times T} = \frac{KF_2}{F_2/F} = KF$$

wherein F is the frequency of pulses $I_1$, $I_2$ ....

In other words K pulses appear on terminal $R_{0-37}$ of the downcounting element 37 during each rotation $\alpha_R$ of the crankshaft and the period of such successive pulses corresponds to a rotation $$\frac{\alpha_R}{K}$$

of crankshaft 17.

The downcounting element 37 has a loading input terminal $Ch_{37}$ which is connected to its terminal $R_{0-37}$ through conductor 39.

Thus each zero value of the count of downcounting element 37 generates on terminal $R_{0-37}$ a signal which automatically resets element 37 into its loading condition.

The output terminal $R_{0-37}$ of the downcounter 37 is connected through conductor 40 to the upcounting terminal $C_{28}$ of a circuit diagrammatically shown at 28 which may comprise m elementary circuits of the shift or slide register type, which is conventional in the art ("type 74164", for example), comprising eight output terminals each of which delivers a pulse for each unit angle of rotation of the crankshaft equal to the arrangement of these output terminals making it possible to distinguish from 0 to $(8^m-1)$ pulses delivered by circuit 37.

Each of the pulses emanating from circuit 37 causes an incrementation of circuit 28 which will generate, at any time, a signal representing the number of pulses received during the time interval $$T = (8^m - 1)T_s = \frac{(8^m - 1)}{K} T.$$

wherein $K \geq 8^m - 1$.

In other words the circuit 28 which constitutes an "angular clock" works as a shift register circuit having $8^m$ output terminals numbered from 0 to $(8^m-1)$ in FIG. 3, so that the rotation of the crankshaft can be followed step by step from its reference position (defined by the angular position of the optical mark on the wheel), for successive angles of rotation of $$\frac{\alpha_R}{K},$$

assuming that the speed of rotation of crankshaft 17 can be considered as constant during the time interval T separating two successive pulses. It appears thus that by properly selecting the values of $\alpha_R$ and K it becomes possible to accurately follow the crankshaft rotation. Generally the values of $\alpha_R$ and K will be so selected that the value of the angle $$\frac{\alpha_R}{K}$$

will be, for example, between 0° 30' and a few degrees, the circuit 28 being then composed of three elementary circuits of the shift register type each having eight output terminals.

Counter 28 has a terminal $RAZ_{28}$ for resetting this counter to zero, this terminal being connected to counter 20 through conductor 41 so that it can be reset to zero by each pulse $I_1$.

The shift register 28 permits selection of an "angular window" or angular interval whose usefulness will appear below.

To this end the two output terminals of the shift register 28 corresponding to the two angular values limiting this angular window are respectively connected to the two input terminals of a flip-flop circuit of the "set-reset" type.

Thus the flip-flop delivers on its output terminal a rectangular signal between the two angular positions which limit the selected "angular window".

This rectangular signal begins when a first pulse appears on the output terminal of shift register 28, this pulse corresponding to the first limit-angle of the angular interval (first change of state of flip-flop 42) and the rectangular signal ends when a second pulse appears on the output terminal of shift register 28, this pulse corresponding to the second limit-angle of the angular interval (second change of state of flip-flop 42).

FIG. 4 diagrammatically shows the arrangement of circuits 26 and 27 of FIG. 2, which together with circuit 25 form the electronic assembly 23.

The accelerometer 18 delivers a signal to a low-pass filter 44 whose cut-off frequencies may for example be from 1 $H_z$ to some hundreds of Hertz. This filter is used for cancelling the signals resulting from the vibrations of the cylinder head which may result from other phenomena, such as closure of the engine valves, etc. . . . and which generally generate parasitic signals at a higher frequency than that of the signals produced by the pressure variations within the engine cylinders. The signal delivered by the accelerometer 18 is successively integrated with respect to time in a first integrator 45, then in a second integrator 46. The signal delivered by the second integrator 46 feeds a threshold circuit 47 which delivers a pulse when this signal reaches its maximum or peak value. The pulse delivered by circuit 47 is applied to the first input-terminal of an AND-gate circuit 48 which transmits this pulse to a flip-flop 49 upon simultaneous receiving of two validating signals on two other input-terminals. The first of these validating signals is delivered by a logic changeover switch 50 whose input-terminal is connected to the output terminal of the first integrator 45. Thus, when the signal from the first integrator is equal to zero, switch 50 validates the signal from the threshold circuit 47 as really corresponding to a maximum of the signal delivered by integrator 46.

In the embodiment illustrated by FIG. 1 it has been chosen to observe only that portion of the signal from the second integrator 46 which corresponds to the peak pressure in a selected cylinder $C_1$ (FIG. 1), assuming that the phenomena are similar in the remaining cylinders. The ignition timing will be the same for each cylinder.

To this end there is used, as a second validating signal, the signal supplied by flip-flop 42, which is connected to circuit 28 (FIG. 3), so that this second validating signal only appears for predetermined angular positions of the crankshaft wherein the pressure peak in cylinder $C_1$ is likely to occur during engine operation. For example one input-terminal of flip-flop 42 is connected to the output terminal of circuit 28 corresponding substantially to a first position of crankshaft 17 wherein the piston in cylinder $C_1$ is at top dead center, the other input-terminal being connected to the output-terminal of circuit 28 corresponding to a second position of crankshaft 17 when the latter has resolved over and additional angle of 60°.

In addition to the signal delivered by AND-gate 48, flip-flop 49 receives a synchronizing signal which may be constituted by the pulses I produced by transducer 20 when the crankshaft is in a preselected reference angular position. This reference position is so selected as to be reached by crankshaft 17 before ignition occurs in cylinder $C_1$ irrespective of the operating conditions of the engine. For example during the crankshaft rotation this reference position will be located at 65° before the position reaches top dead center in cylinder $C_1$.

Of course the synchronizing signal may be the signal delivered by one of the output-terminals of circuit 28 provided that in all cases this reference signal is delivered before spark ignition occurs in cylinder $C_1$.

The output-terminal of flip-flop 49 which is initially in the "zero state" is switched to "one" state upon receiving the synchronizing signal, and is set back to the zero state upon receiving the validating signal delivered by gate 48. There is thus obtained a rectangular signal whose width is a function of the angle θ of rotation of the crankshaft between its reference position and the position corresponding to the maximum pressure in cylinder $C_1$. This signal is transmitted to a first input-terminal of a AND-gate circuit 51 which receives on a second input-terminal the output pulses of circuit 28, or angular clock H. On a third input-terminal of circuit 51 is applied the output signal of a flip-flop 52 which is controlled by the synchronizing signal and by the output signal of a counter 53 of the shift register type (Type 74 164, for example). This last circuit counts the synchronizing pulses and delivers, on one of its output-terminals, a signal representing a number n of working cycles of the engine.

At the arrival of a first synchronizing signal, AND-gate 51 receives simultaneously the signal delivered by flip-flop 49 and the signals delivered by flip-flop 52 which constitute the validating signals and gate 51 leaves passage to $$\frac{\theta K}{\alpha_R}$$

pulses from clock H during the whole duration of the signal produced by clock 49. The same phenomenon occurs during n working cycles of the engine and the cycle counter 53 delivers a signal which triggers flip-flop 52. The number of pulses which have passed AND-gate 51 is divided by the number n of cycles by circuit 54 which delivers an average pulse count $$r_m = \frac{\theta_m K}{\alpha_R}$$

representing the average value of the rotation angle $\theta_m$ of the crankshaft between its passage at the reference position and at the position corresponding to the maximum pressure in cylinder $C_1$.

These pulses are applied to the downcounting terminal $D_{55}$ of an up-and downcounter 55 (Type 74 193, for example) which has been initially set at the theoretical value $r_{th}$ of the pulse number, corresponding to the theoretical angular interval $\theta_{th}$ between the reference position of the crankshaft and the position at which the pressure in the cylinder $C_1$ should be maximum.

The absolute value of the difference $r_{th} - r_m$ representing the difference $\epsilon = \theta_{th} - \theta_m$ appears on the output-terminals of circuit 55 connected to the input-terminals of memory 56 (Type 74 174, for example), the sign of this difference being indicated at one of the output-terminals generally designated as "carry" terminal and "borrow" terminal.

The transfer of the information $\epsilon$ from the downcounter 55 to the memory 56 is achieved by the pulse generated by the cycle counter 53, this pulse being delayed by the delaying circuit 57a. The same pulse, further delayed in a delaying circuit 57b, resets the up-and downcounter 55 to its initial state through input-terminal Ch 55. The memorized information $\epsilon$ is applied to a summing-substracting circuit 58 (Type 7483) whereto is also applied the theoretical value $\beta_{th}$ of the rotation angle of the crankshaft between its reference position and the theoretical position thereof at which ignition in the cylinder should occur, so that the pressure in the cylinder will be maximum when the crankshaft has rotated over an angle $\theta_{th}$ with respect to its reference position.

Circuit 58 delivers a signal representing the value $$\beta_{com} = \beta_{th \pm \epsilon}$$

of the angle of rotation of the crankshaft between the reference position and the actual position at which ignition should occur in cylinder $C_1$.

This signal is applied to the set terminals of an up-and downcounter 59 (Type 74 193) whose downcounting terminal $D_{59}$ is connected to the output of an AND-circuit 60 which receives the synchronizing signal on a first input terminal and the signal from angular clock H on a second input terminal. At each zero value the circuit 59 delivers on its terminal $R_{0\ 59}$ an ignition control signal which is transmitted through a suitable circuit 61 to the trigger circuit of thyristor 4 as well as to loading terminal $Ch_{59}$ to provide resetting of up-and downcounter 59.

Changes may be made without departing from the scope of the present invention. It is for example possible to separately adjust the ignition timing for each of the engine cylinders by using as many circuits composed of elements 48 to 61 as may be required.

In some operating conditions of the engine the ignition timing may be adjusted over a greater or lesser time interval to a value which differs from the optimum value, for example when it may be desired to have a faster temperature rise during the engine starting periods. An up-and downcounting circuit 62 may be placed between circuits 58 and 59 (this circuit 62 is shown in dotted line in FIG. 4) for adjusting the value $\beta_{com}$ by adding thereto a correcting value $\gamma$. Such modification may either be permanently or temporarily effected. In the latter case the duration of the correction may be either constant or a function of a parameter measured by detector 63.

Such corrections may also be carried out upon occurence of the knocking phenomenon, or with a view of obtaining exhaust gases with the smallest possible content of polluting compounds . . . etc. . . .

The values $r_{th}$ and $\beta_{th}$ set in circuits 55 and 58 will obviously have to be accurately determined for each engine. Displaying of such values measured beforehand as a function of the precise operating conditions of the engine may be programmed in dependence with the same operating conditions.

We claim:

1. A method for automatically adjusting the ignition timing of a controlled ignition engine to the optimum value of this timing corresponding to the maximum output and efficiency of the engine, wherein the ignition timing is so adjusted that the pressure peak in at least one cylinder occurs at a predetermined angular position of the drive shaft of the engine, this method comprising:
   determining the angular position of the drive shaft,
   detecting the accelerations at a location on the cylinder head of the engine and providing, during at least a selected fraction of the rotation of the drive shaft and in a low frequency band, a first signal corresponding to these accelerations,
   integrating said first signal to obtain a second signal,
   integrating the second signal to obtain a third signal from which may be determined the maximum value thereof with respect to the angular position of the drive shaft, and
   adjusting the ignition timing as a function of the angular position of the drive shaft corresponding to the maximum value of said third signal.

2. A method according to claim 1, wherein the ignition timing is so adjusted that the maximum value of said third signal is observed at a predetermined angular position of the driving shaft.

3. A method according to claim 2, wherein a correction is applied to said optimum adjustment of the ignition timing, this adjustment being selected as a function of the operating conditions of the engine.

4. A method according to claim 1, which further comprises detecting when said second signal reaches zero, and validating the detection of the maximum value of the third signal when the value of the second signal is zero.

5. A device for automatically adjusting the ignition timing of an engine, comprising ignition control means, and a detector of the angular rotation of the engine drive shaft, wherein the device comprises an accelerometer secured to the cylinder head of the engine and generating a first signal representing the accelerations to which the cylinder head is subjected at the point of location of the accelerometer, a low pass filter connected to said accelerometer and generating a first signal, a first integrator connected to said filter and delivering a second signal, a second integrator connected to said first integrator and delivering a third signal, means connected to said second integrator for detecting a maximum value of said third signal during at least a portion of the rotation of the engine drive shaft, means, connected to said last-mentioned means and to said detector, for detecting the angular position of the drive shaft corresponding to said maxmimum value, comparing means connected to said detecting means for measuring the difference between said measured angular position and a reference angular position, and adjusting means, connected to said comparing means, for adjusting said control means as a function of said difference.

6. A device according to claim 5, which further comprises means for validating the determination of the angular position of the drive shaft corresponding to the maximum in the third signal, said validating means being connected to said first integrator and to said detecting means and being adapted to validate the action of the detecting means when said second signal has a value of zero.

* * * * *